United States Patent [19]

Damon

[11] 4,002,327
[45] Jan. 11, 1977

[54] RESILIENT BUSHING

[75] Inventor: James J. Damon, Dearborn, Mich.

[73] Assignee: Ford Motor Company, Dearborn, Mich.

[22] Filed: Dec. 23, 1974

[21] Appl. No.: 535,929

[52] U.S. Cl. .................. 267/57.1 A; 267/63 A; 248/9; 248/15; 308/238

[51] Int. Cl.² .......................................... F16F 1/16

[58] Field of Search ............. 267/57.1 R, 57.1 A, 267/63 R, 63 A; 64/11 R; 308/238, 26, 36.1; 248/9, 15; 403/225, 226, 227, 228; 16/2, DIG. 6; 29/149.5

[56] References Cited

UNITED STATES PATENTS

| 2,621,923 | 12/1952 | Krotz | 267/57.1 R |
|---|---|---|---|
| 2,925,973 | 2/1960 | Aebersold | 248/9 |
| 3,572,677 | 3/1972 | Damon | 267/57.1 R |
| 3,584,857 | 6/1971 | Hipsher | 267/57.1 R |
| 3,771,846 | 11/1973 | Bass et al. | 388/238 |
| 3,850,418 | 11/1974 | Hipsher | 267/57.1 A |
| 3,881,711 | 5/1975 | Lemaitre | 267/63 R |
| 3,888,472 | 6/1975 | Hofmonn | 267/57.1 A |

FOREIGN PATENTS OR APPLICATIONS

| 203,394 | 9/1956 | Australia | 248/15 |
|---|---|---|---|
| 1,361,484 | 7/1974 | United Kingdom | 267/57.1 H |
| 679,404 | 9/1972 | United Kingdom | 248/9 |

Primary Examiner—James B. Marbert
Attorney, Agent, or Firm—Clifford L. Sadler; Keith L. Zerschling

[57] ABSTRACT

An annular resilient pivot bushing is described which is suitable for connecting a vehicle suspension link to a vehicle body. The bushing provides greater resistance to linear movement of the suspension link in one direction than to linear movement in the opposite direction. In the preferred construction, this is achieved by using an outer tubular shell for the bushing which has inwardly extending flutes on one of its sides and an intermediate elastomeric element that is similarly fluted. When used in a vehicle suspension system the differential in resiliency prevents a resonant condition from developing that might otherwise cause vehicle body shake.

1 Claim, 5 Drawing Figures

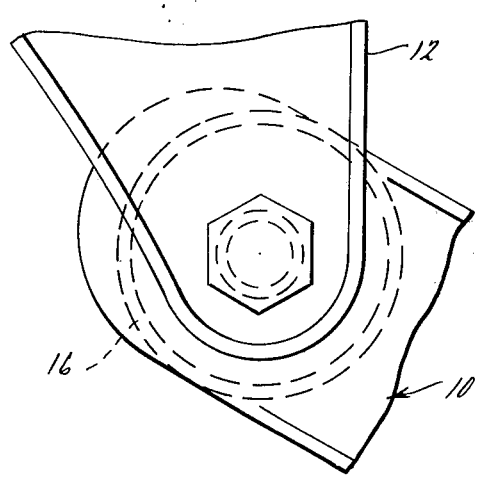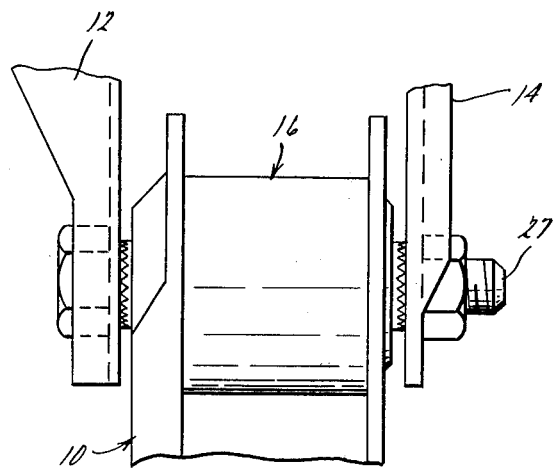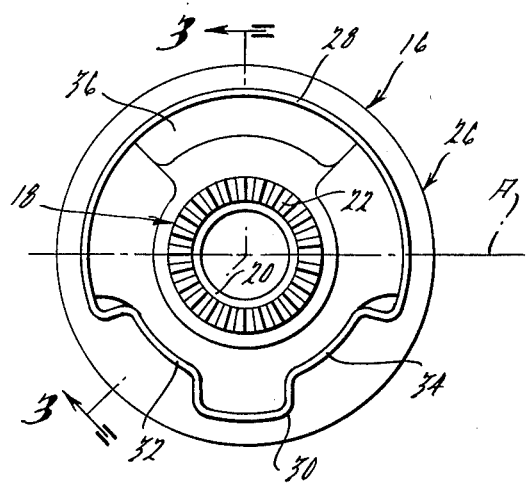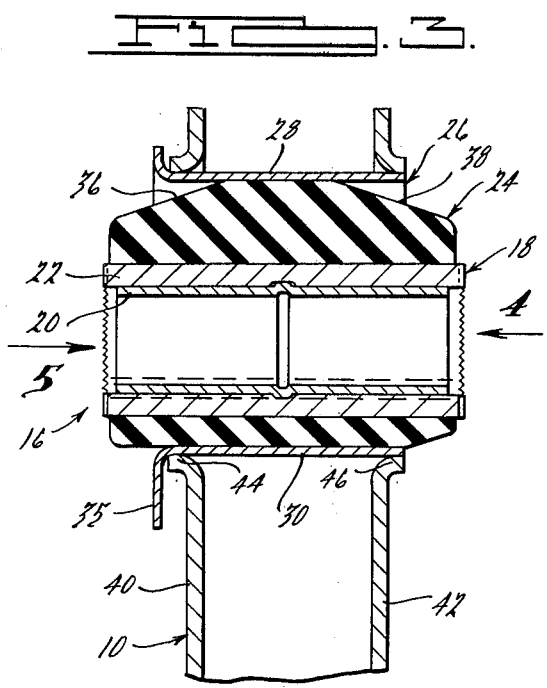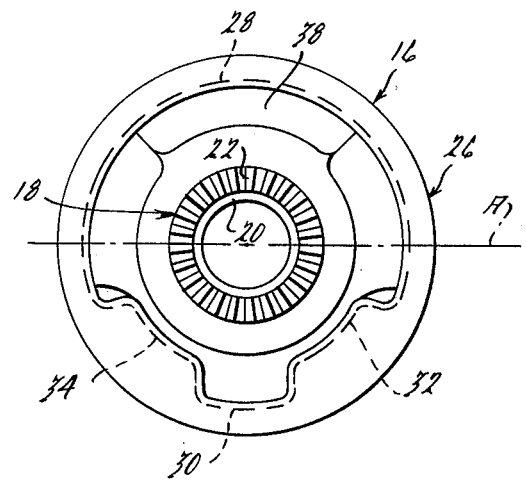

RESILIENT BUSHING

BACKGROUND OF THE DISCLOSURE

In a motor vehicle suspension system it is common practice to provide a resilient bushing for pivotally connecting a suspension link to a vehicle body. Commonly, these bushings have inner and outer concentric cylindrical members with an annular rubber body between the members. In a conventional installation the outer member is connected to the suspension link and the inner member is connected to a bracket secured to the vehicle body. This construction permits the suspension link to pivot with respect to the body while the intermediate elastomeric member isolates the vibrations occurring at the road wheels and attenuates their transmission to the vehicle body.

While the elastomeric member damps road noises and vibrations, its resiliency contributes to an undesirable condition known as shake. When a vehicle travels over a road having a particular irregularity, a resonant condition can develop in which the suspension link will vibrate or resonate in a fore and aft direction as a result of the resiliency of the pivot bushing. This fore and aft oscillation of the suspension link causes objectionable body shake.

In view of the state of the art it is a principal object of the present invention to provide a resilient bushing for connecting a suspension link to a vehicle body which prevents a resonant vibration from developing. The present disclosure describes a resilient bushing that is an improvement upon the resilient bushing shown in U.S. Pat. No. 3,572,677.

BRIEF SUMMARY OF THE DISCLOSURE

In the presently preferred embodiment of this invention a resilient pivot bushing has an inner cylindrical member, an outer tubular member and an intermediate annular elastomeric member interposed between the inner and outer members. The three members are arranged in a generally concentric fashion. The outer member has first and second halves disposed on either side of an imaginary plane containing the axis of the inner cylindrical member. The first half of the outer member is of semi-cylindrical shape. The second half is generally semi-cylindrical with a pair of circumferentially spaced apart inwardly extending flutes.

The elastomeric member has a cylindrical inner surface portion adjacent to the outer surface of the inner member. The outer surface of the elastomeric member has a semi-cylindrical surface portion adjacent to the first half of the outer member but with edges that are beveled along a 90° arc. The outer surface of the elastomeric member also has spaced apart flutes to complement the interior of the second half of the outer member.

This construction of a resilient pivot bushing provides greater resiliency to radial displacement of the inner member when it is moved in the direction toward the first half of the outer member than when it moves in the opposite direction toward the flutes of the outer member. When installed in a suspension of a motor vehicle, displacement of the suspension link will encounter greater resiliency when it is moved in one direction than in the other. The unequal resistance to linear movement of the suspension link prevents the creation of a resonant condition and, thereby, prevents objectionable vibrations and shake from being induced into the vehicle body.

BRIEF DESCRIPTION OF THE DRAWINGS

The many objects and advantages of a resilient pivot bushing for a motor vehicle suspension system constructed in accordance with this invention will become apparent upon consideration of the following detailed description and the accompanying drawings, in which:

FIG. 1 is a side elevational view of a suspension link connected to a vehicle body bracket by a resilient pivot bushing that incorporates a preferred form of the invention.

FIG. 2 is an elevational view of the bushing, suspension link and frame bracket of FIG. 1.

FIG. 3 is a sectional view of the bushing and suspension link of FIGS. 1 and 2 showing the bushing as it would appear taken along section line 3—3 of FIG. 4.

FIG. 4 is an end view of the pivot bushing as viewed in the direction of arrow 4 of FIG. 3.

FIG. 5 is an end view of the bushing as viewed in the direction of arrow 5 of FIG. 3.

DETAILED DESCRIPTION OF A PREFERRED EMBODIMENT

Referring now to the drawings for a more complete understanding of the present invention, FIGS. 1 and 2 disclose a suspension arm or link 10 that is connected to frame brackets 12 and 14 of a motor vehicle by means of a resilient pivot bushing 16. The bushing 16 is constructed in accordance with the teachings of this invention.

The resilient bushing 16 includes a two-piece inner tubular assembly 18 having a tubular member 20 surrounded by a second tubular member 22. The tubular members 22 and 20 are of cylindrical shape and are secured together by a press fit to form the assembly 18. An annular elastomeric member 24 surrounds the tubular assembly 18 and it, in turn, is surrounded by a tubular outer member 26. The inner tubular assembly 18 and the outer member 26 are constructed to provide means for assemblying the bushing 16 into its proper position relative to the suspension arm 10 and frame bracket 12. A bolt 27 passes through the center of the inner tubular assembly 18 and through aligned holes in the frame brackets 12 and 14. The ends of the tube 22 are serrated so that they bite into the surface of the brackets 12 and 14 when the bolt 27 is tightened. The engagement of the ends of the tube 22 with the brackets 12 and 14 prevents rotation of the tube 22.

The tubular assembly 18 is of cylindrical shape. The inner surface of the annular elastomeric member 24 is also cylindrical and is bonded to the outer surface of the tube 22. The outer member 26 is of annular shape and has first and second integral halves that are situated on either side of an imaginary plane A that contains the axis of the tubular assembly 18. The first half of the outer member 26 is identified in the drawing by reference numeral 28 and the second half is identified by reference numeral 30. Portion 28 of the outer member 26 is semi-cylindrical. Portion 30 is generally semi-cylindrical with two inwardly extending flutes 32 and 34 whose centers are 90° circumferentially spaced apart. One end of the outer member 26 terminates in a radially extending flange 35.

The outer surface of the elastomeric member 24 complements the interior of the outer member 26. The portion adjacent to the first half 28 has a cylindrical surface except for edge portions 36 and 38 that are beveled on 90° arcs. Between the beveled segments 36 and 38, a substantially smaller surface area of the elastomeric member 24 is in contact with the interior surface of the outer member 26. The exterior surface of the member 24 adjacent to the second half 30 of the outer member 26 is fluted.

The bushing 16 connects the suspension link 10 to the frame brackets 12 and 14 in the following manner. The link 10 is formed with spaced flanges 40 and 42 that are provided with large aligned holes 44 and 46. The shape of the holes 44 and 46 corresponds to the fluted shape of the exterior of the outer member 26 except that it is a bit smaller in size. The bushing 16 is secured to the suspension link 10 by means of a press fit engagement between the outer member 26 and the periphery of the holes 44 and 46.

With the bushing 16 secured to the suspension link 10, the link and bushing are connected to the frame brackets 12 and 14 by means of the bolt 27. The bolt 27 extends through aligned holes in the brackets 12 and 14 and through the center of the tubular assembly 18. The serrations on the ends of the tube 22 bite into the adjacent surfaces of the flanges 12 and 14 to provide a means that prevents rotation of the inner tubular assembly 18 and locates the bushing 16 and arm 10 in their proper angular relationship with respect to the frame brackets 12 and 14.

OPERATION

When the bushing assembly 16 is installed in a vehicle to connect the suspension link 10 with the vehicle frame brackets 12 and 14, the bushing will exhibit different spring rates for forward and rearward movement of the link with respect to the vehicle body. When the arm 10 is moved forwardly the portion of the elastomeric member 24 adjacent to the second half 30 of the outer member 26 will be loaded in compression. It will be noted from the drawings that substantial portions of the resilient member 24 adjacent to the flutes 32 and 34 are of reduced radial thickness and, therefore, those portions will have a higher spring rate. As a consequence, when the suspension link 10 is moved forwardly it will encounter a relatively high spring rate as the portions adjacent the flutes 32 and 34 of the rubber 24 are loaded in compression.

When the suspension link 10 is forced rearwardly, the portion of the elastomeric member 24 adjacent to the outer member half 28 will be loaded in compression. This portion of the elastomeric member 24 will have a low effective spring rate because it is thicker and, in addition, because the arcuate portions 36 and 38 are beveled to remove the rubber that would otherwise be in engagement with the outer member half 28.

Thus, forward movement of the suspension link 10 encounters a high spring rate and rearward movement encounters a low spring rate. Because the rates are different fore and aft movement of the suspension link 10 will not produce a resonant condition which could induce vehicle body shake.

Jounce and rebound movement of the suspension arm 10 will be accommodated by the torsional distortion of the elastomeric member 24.

The foregoing description presents the presently preferred embodiment of this invention. Details of construction have been shown and described for purposes of illustration rather than limitation. Modifications and alterations of the invention may occur to those skilled in the art that will come within the scope and spirit of the following claims.

I claim:

1. A suspension construction for a motor vehicle comprising a suspension link, a vehicle frame component and a resilient bushing assembly interconnecting said link and said component;
   said bushing assembly comprising an inner cylindrical member having serrated ends engaging said component;
   an annular elastomeric body surrounding said inner cylindrical member;
   an outer generally tubular member surrounding said elastomeric body and connected to said suspension link;
   said outer member having first and second halves disposed on either side of a plane containing the axis of aid inner cylindrical member and arranged perpendicular to the longitudinally axis of said suspension link;
   said first half of said outer member being semi-cylindrical in shape;
   said second half being generally semi-cylindrical with a pair of circumferentially spaced apart inwardly extending flutes;
   said inner cylindrical member being coaxially arranged with respect to said outer member;
   the radial distance between said inner member and said flutes of said outer member being substantially less than the radial distance between said inner member and said outer member;
   said elastomeric member having a cylindrical inner surface complementing the outer surface of said inner member and an outer surface with a pair of circumferentially spaced flutes complementing the inner surface of said outer member;
   said inner and outer surfaces of said elastomeric member being in flush engagement with said inner and outer members, respectively;
   said elastomeric member having beveled edge portions adjacent said first half that extend inwardly of the outer edges of said first half,
   said resilient bushing assembly being constructed to provide a first spring rate for linear displacement of said suspension link in a first direction perpendicular to said plane in which said inner member is displaced toward the center of said first half of said outer member;
   said resilient bushing assembly being constructed to provide a second spring rate for linear displacement of said suspension link in a second direction that is opposite to said first direction;
   said first spring rate being substantially less than said second spring rate.

* * * * *